United States Patent Office 3,457,215
Patented July 22, 1969

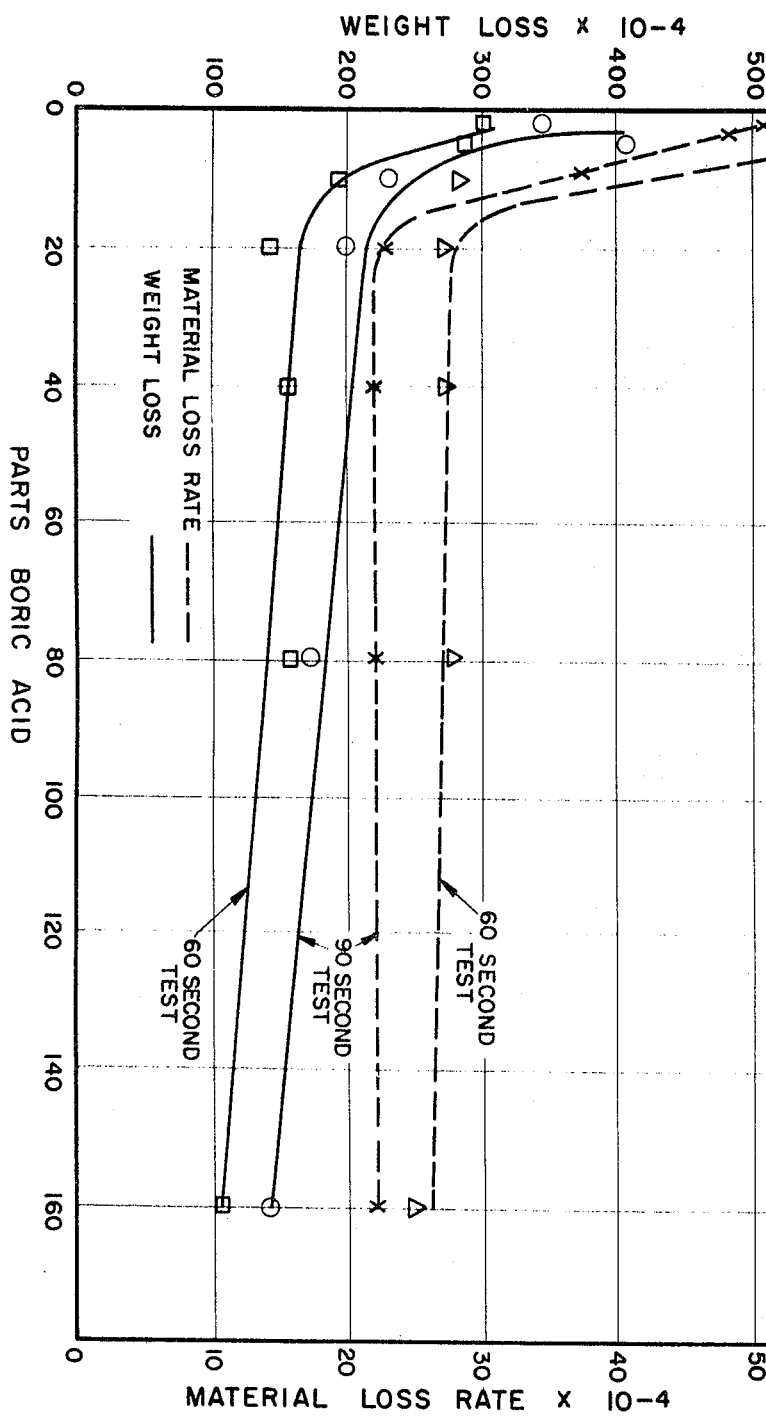

3,457,215
ABLATIVE INSULATION PREPARED FROM EPOXY RESIN, A POLYSULFIDE AND BORIC ACID
John G. Sommer, Jr., Cuyahoga Falls, Ohio, assignor to The General Tire & Rubber Company, a corporation of Ohio
Filed Apr. 27, 1964, Ser. No. 362,589
Int. Cl. C08g 30/10; C09k 3/28
U.S. Cl. 260—37                    7 Claims

ABSTRACT OF THE DISCLOSURE

A trowelable insulating material, applicable as a liner for, among other purposes, rocket thrust chambers, consists of a blend of an epoxy resin, a polyfunctional flexibilizing agent such as a polysulfide, and boric acid, the epoxy resin and polysulfide are reacted together at room temperature using an amine curing agent. The boric acid, when used in an amount of at least 1 part per 100 parts of epoxy resin, improves the ablation properties of the insulation.

DESCRIPTION OF THE INVENTION

The combustion of rocket propellants, in the confined volume of the thrust chamber, and their ultimate release through one or more orifices usually occurs at high temperatures. The gaseous products produced by the decomposition of the propellant flow at extremely high velocity and tend to be erosive. This places considerable stress and strain upon the gas escape orifice as well as other portions of the thrust chamber structure. While the combustion of the rocket propellants is usually of short duration, the combustion products at the temperatures and pressures generated can destroy even the strongest and best high temperature resistant alloys of iron, titanium, chromium, nickel, beryllium and the like unless they are protected. As a consequence of such structural failure, the rocket may be totally destroyed or perhaps only a portion such as the gas escape orifice may be destroyed. In the latter case the rocket proceeds in an erratic uncontrollable path and must be destroyed.

Attempts have been made to protect those parts of the rocket structure which may be exposed to the high temperature and erosive flow conditions of the burning propellant. These attempts have principally been directed to methods of protecting the rocket structure by applying some sort of a protective coating or lining to the surfaces which are exposed to the burning propellant and hot turbulent gases. Ceramics as well as plastics and rubbers, both filled and unfilled, have been tried. These include phenolic resins, epoxy resins, high temperature melamine-formaldehyde coatings, polyester resins and the like. These plastics for the most part cure to a rigid structure. Due to this rigid structure the plastics, when they shrink or expand on exposure to the rapid temperature and pressure changes encountered during the burning of the propellant, crack or blister. The result is that the metal of the rocket is affected and may fail.

Some rubber-like elastomer systems have been used. These elastomeric systems are ablative in nature, that is, the elastomer is sacrificed or consumed in a manner such that the rocket chamber is protected from the high temperatures generated during the burning of the fuel. Certain of these systems have been fairly successful in protecting the structural members of the rocket under firing conditions. Particularly useful are those which provide asbestos in the lining or coating. This type coating is adapted to withstand flame temperatures and the high velocity flow conditions resulting from the combustion of liquid or solid propellants. Such coatings or linings are capable of enduring for a time sufficient to allow complete combustion of the propellant. Coatings of this type are the subject of copending application Ser. No. 153,675, which application has been abandoned in favor of continuation-in-part application Ser. No. 519,195 filed on Jan. 7, 1966 and is assigned to the assignee of the present invention. The disclosure of that application is hereby incorporated herein by reference.

Briefly stated, the elastomeric coatings of that invention contain from 3 to 200 parts of an asbestos fiber per 100 parts of elastomer together with minor amounts of other compatible materials.

A further improvement in the aforementioned application, Ser. No. 519,195, now Patent Number 3,347,047, embodies the addition of chromic oxide thereto. This invention results in a much improved insulating material which is useful in rocket construction and is the subject of copending application Ser. No. 690,765, which is also assigned to the assignee of the present invention.

The above-described insulating materials are generally compounded by working on a rubber mill with a final calendering step. The calendering produces a uniform, as to both thickness and width, material which is homogeneous and free from voids. A typical commercially available material is 36 inches wide, 0.10 inch thick, and 50 feet long. Other sizes are also sold. The roll of insulating material, still in an uncured state, is delivered to the rocket manufacturer who applies it to the rocket.

The insulation is applied to the interior of the thrust chamber. This may be done in the uncured state or the insulation may be precured prior to application. If the former procedure is followed, the rocket chamber is first thoroughly cleaned, coated with an adhesive, and precut pieces of the insulation are fitted into place. Heretofore, the adhesives used required heat and pressure to set them. This necessitated inserting cure bags into the rocket chamber. Steam is circulated through the bags to obtain sufficient heat and pressure to set the adhesive.

The other technique used in the application of insulation to rocket thrust chambers is to precure the material. To obtain a proper fit a mold, having the configuration of the area where the piece is to be used, must be built. The insulation is then cut to size, cured, and shaped in the mold so that it has the desired configuration. Thereafter, the preshaped, cured piece of insulation is put in place and secured by means of an adhesive.

Both of these methods are laborious and time-consuming and require extensive tooling. The former method, in particular, is limited because of the above-mentioned service requirements. In addition, both of these methods are expensive because of the labor of cutting and fitting specific size pieces. These methods result in a certain amount of waste insulating material which is relatively expensive.

It would, of course, be advantageous to eliminate as far as possible the expensive tooling and reduce the time and labor involved in the installation of the insulation. One method of accomplishing this would be to use a trowelable or otherwise easily workable material as opposed to the materials heretofore available which were classified as being millable, that is, workable on a rubber mill. Unfortunately, such a material has not been available heretofore.

We have now discovered a trowelable insulating material which is chemically compatible with currently used insulations and which when cured has about the same density and resistance to rocket-firing conditions. Further, the trowelable insulating material of this invention is adhesive and it may be used as an adhesive with the above-described millable insulations.

The trowelable insulations material of the invention comprises a composition of boric acid together with a previously prepared composition of an epoxy resin and a polyfunctional flexibilizing agent. A curing agent is generally added to the composition in order to obtain set-up in a reasonable time. Also, it is often desirable to add fillers, e.g. asbestos, to the composition to obtain some improved result.

Flexibilized epoxy resins have been known in the art for a number of years. See, for example, the discussions of these materials in Epoxy Resins, Their Applications and Technology, Lee and Neville, McGraw-Hill Book Company, Inc., 1957, chaper 7. The most important flexibilizing agents are thermoplastic polyamide resins, polysulfides, fatty diamines and certain polyesters. These materials are thought to impart flexibility or stretch to the epoxy by virtue of a reaction with epoxy groups.

Although these materials have been known, they have not heretofore been useful as high temperature insulators or adhesives and it is only by virtue of the present invention, that is, the inclusion of boric acid, that they can be so used.

The epoxy resins useful in the invention are those which when compounded with a flexibilizer give a trowelable composition. Polymers of this type are liquids at temperatures less than about 65° C. These polymers have an epoxide equivalent of at least 43 and contain more than one 1,2 epoxy group per molecule. Suppliers of materials of this type which sell them under various trade names such as Epon, D.E.R., D.E.N., Araldite and Epi-Rez. are Shell Chemical Co., Dow Chemical Co., Ciba Co., Inc., and Jones Dabney Co.

The polysulfides used in the practice of our invention are mercaptan terminated long chain aliphatic polymers which may contain in the backbone chain disulfide linkages. By mercaptan terminated, we mean that the molecule must contain in the backbone chain and any side chains at least two mercaptan groups (—SH) or, as they are sometimes called, sulfhydryl groups. By long chain, we mean those polymers having an average molecular weight of at least 300. Typical of these polymers are, for example, the compounds represented by the structural formulas H—S—R—S—H and H—S—R—S—S—R—SH where R is an organic group.

Commercially available polymers of this type are those sold by the Thiokol Chemical Corporation and designated as LP-3, LP-33, and LP-8. These are polymers of bis (ethylene oxy) methane contained disulfide linkages and differing from one another primarily in their molecular weights.

In addition to the polysulfide, other of the previously-noted flexibilizers may also be used, and later references may be construed to mean any of the listed flexibilizers.

The reaction of the epoxy with the polysulfide may be represented by the following:

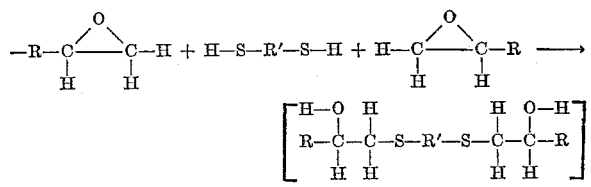

As has been mentioned, this reaction proceeds rather slowly requiring the use of a curing agent or catalyst in order to obtain curing or complete polymerization in a reasonable time. The curing agents are available in both solid and liquid form. The particular one chosen can affect to some degree the final properties of the polymer. The curing agents embrace a number of chemical classes. Representative members of the class are phthalic anhydride, maleic anhydride and pyromelletic dianhydride, 3,3′ iminobispropylamine, dimethylaminomethyl phenol, m-phenylenediamine, 4,4′ methylenedianiline and triethylenetetramine.

The boric acid may be any commercial grade material of reasonable purity. A small particle size is preferred because of ease of obtaining an intimate homogeneous distribution of the boric acid throughout the composition. The amount of boric acid required to obtain the increased resistance to ablation has been found to be from about 1.00 to 200 parts per 100 parts of epoxy resin. However, the addition of more than about 50 parts is not warranted. Any excess over this amount does not yield a worthwhile increase in the ablative resistance while amounts less than about one part per 100 parts of epoxy resin do not give the desired increase. Corresponding boric anhydrides may also be used, and where the term "boric acid" is used, it is intended to include boric anhydride.

The ratio of epoxy resin to the polysulfide may vary from about 1:0.75 to about 1:2.5. At ratios of considerably more or less than this, the final product does not possess the characteristics required for the particular application.

The amount of catalyst used will, of course, vary with the particular composition used and the optimum amount can readily be determined by any worker skilled in the art.

The amount of other material, inert filler, used may vary up to about 40 parts per 100 parts of epoxy resins. The most commonly used filler is asbestos of the type described in the aforementioned copending application Ser. No. 519,195. When asbestos is used, the amount varies from about 10 to 40 parts per 100 parts of epoxy resin. Other fillers may be used in addition to and in view of asbestos. These fillers must not interfere with the reactions involved in the forming or setting up of the insulating compositions. Fillers are added for a number of reasons but particularly to enhance the total insulating value of the system.

The order of addition of the essential components of our invention is of importance in that if the correct order is not followed, the composition, particularly if not to be immediately used, would react and could render the insulation useless by causing it to set up prior to application.

The trowelable composition of our invention is conveniently made up as two separate components; one contains the epoxy resin and boric acid, and the other the polysulfide and polymerization catalyst. If inert substances are used, they may be added to either component or to the product formed by mixing the two components. The epoxy resin must be kept separated from the polysulfide until use because even in the absence of a catalyst the two substances will polymerize to give a copolymer which cannot thereafter be applied to the rocket thrust chamber. The catalyst and epoxy resin must be kept apart because the catalyst will cause the epoxy to set up rendering it useless for later application. The boric acid and amine catalyst also react to give some unknown product which appears to inhibit the subsequent reaction of the epoxy and polysulfide.

The following examples more fully illustrate the practice of the present invention and they are intended only for purposes of illustration and not by way of limitation.

EXAMPLE I 100 parts of a bis-phenol A polyglycidyl ether of epoxy resin referred to as Epon 828 having an epoxy number of 180 to 195 and a viscosity of 10,000 to 16,000 cps. at 25° C. were added to 130 parts of a polysulfide polymer having a molecular weight of 1,000, a viscosity of 1,000 cps. at 80° F. and a specific gravity of 1.27. There was then added to the mixture 20 parts of an impalpable boric acid having a specific gravity of 1.435 and a particle size such that 70% passed through a 325 mesh screen. There was finally added 10 parts of 2,4,6-tri (dimethyl amino methyl) phenol, a catalyst, having a specific gravity of 0.973. The mixing was accomplished over a period of about fifteen minutes in a sigma blade mixer using conventional techniques. This material was then cast into molds in the form of discs having diameters of two inches and thicknesses of 0.5 inch. The molds were lubricated for ease of removing the sample.

These cured specimens were then subjected to an oxyacetylene flame test (O/A Test) in order to determine the insulating value of the vulcanized specimens to compare the performance of the various specimens. An oxyacetylene torch having a 0.075 inch diameter nozzle was positioned with the nozzle located exactly one inch above the center of the upper surface of the specimens and normal thereto. The torch was so mounted that it could oscillate through an arc of 60° from the perpendicular changing the flame direction without moving the point of contact of the flame on the specimen surface. The purpose of this oscillation was to simulate the erosive flow conditions present during the actual firing of a propellant contained in a chamber. The oscillation was maintained at 10 cycles per minute for purposes of the test. The flow rates of oxygen and acetylene were controlled carefully so that a relative ratio of 1:1.1 was maintained to produce a reducing flame. A protected thermocouple was placed under each specimen during the test. A specimen failed if it burned through in less than 90 seconds or if it provided such poor insulation that the thermocouple reached a temperature of 400° F. in less than 90 seconds. It was generally considered that if a specimen could withstand this test it was composed of a satisfactory insulating material. The specimens were weighed before and after the test to determine their weight loss. The specimens after exposure were carefully examined, particularly the surface exposed to the flame. Examination of a diametric section of each surviving specimen revealed a lower layer of apparently unaffected material, an intermediate layer of degraded material which showed the influence of the heat and turbulent flow encountered by the oscillation of the oxyacetylene torch and a "char layer" on top. The char layer was apparently composed of carbonaceous material and residues of the fibers and fillers. This fibrous network was coated and bonded in part with carbonaceous material. The thicknesses of the respective layers were also measured. From these measurements there was calculated the important determinant, the material loss rate (MLR) in inches per second; the MLR equals $$\frac{t_o - t_v}{E}$$

where "$t_o$" is the original thickness in inches of the disc specimen at its center; "$t_v$" is the minimum thickness in inches of the unaffected material after exposure measured at the approximate center of the specimen and "E" is the time of the test in seconds. The result of the test for 90 seconds of the above composition was:

Material loss rate (in inches per second) _____ 0.0023
Weight loss (pounds) _____ 0.0197

In addition, the temperature rise on the back of the sample during the test was measured and found to be 175° F.

The material loss rates in inches per second for periods of 30, 60, and 90 seconds were respectively 0.0043, 0.0027, and 0.0023. The respective weight losses were 0.0081, 0.0144, and 0.0197 pound.

COMPARATIVE EXAMPLE I

Example I was repeated except that the formulation contained no boric acid. The resulting material was tested as in Example I and the material loss in inches per second at 30 seconds was 136 compared to 43 in Example I. However, much more meaningful is that in the 60 and 90 second tests, which are much more closely correlated to the actual service requirements of the material, the material was entirely consumed. This result is to be compared to the respective rates in Example I of 27 and 23. The actual weight loss of this material is considerably more than that of Example I.

This comparison makes it clear that there is a very real advantage obtained in the practice of the invention.

EXAMPLES II–VIII

A series of examples were run using the procedure and composition of Example I except that the amount of boric acid used was varied from 1.25 to 160 parts based on one hundred parts of the epoxy resin. The resulting compositions were tested as in Example I and the results are reported in Table I below. (For completeness and ease of comparison the results of Example I and comparative Example I are also included.)

TABLE

| Ex. | Material loss, sec.×10⁻⁴ | | | Weight loss, lbs.×10⁻⁴ | | | Amount of boric acid, parts/100 parts epoxy resin |
|---|---|---|---|---|---|---|---|
| | 30 | 60 | 90 | 30 | 60 | 90 | |
| 1 | 43 | 27 | 23 | 81 | 144 | 197 | 20 |
| 1o | 136 | X | X | 283 | X | X | |
| 2 | 120 | X | X | 265 | X | X | 1.25 |
| 3 | 114 | 66 | 50 | 258 | 302 | 345 | 2.5 |
| 4 | 60 | 60 | 48 | 144 | 292 | 407 | 5.0 |
| 5 | 36 | 28 | 37 | 100 | 187 | 228 | 10.0 |
| 6 | 23 | 27 | 22 | 84 | 157 | 215 | 40.0 |
| 7 | 33 | 28 | 22 | 69 | 154 | 169 | 80.0 |
| 8 | 30 | 25 | 22 | 66 | 107 | 143 | 160.0 |

X indicates that the sample was consumed and no value obtained.

The single sheet of drawing is a graphic representation of this data.

By referring to this graph, it can be seen that relatively large improvements are obtained by additions of up to between about 20 to 30 parts and that thereafter the degree of improvement per unit of boric acid becomes progressively smaller.

EXAMPLE IX

A composition of 180 parts of the polysulfide polymer, 100 parts of the epoxy resin, ten parts of the catalyst and 20 parts of the boric acid, all of the type used in Example I, was prepared as in Example I. In addition, there was added 40 parts of inert material, primarily chrysotile asbestos fiber. The resulting composition was tested as in Example I and the results for the 30, 60 and 90 second periods were material loss rates of 0.0033, 0.0027, and 0.0020 and weight losses of 0.0081, 0.0140 and 0.0195.

COMPARATIVE EXAMPLE IX

Example IX was repeated except that no boric acid was used in the composition. When the resulting composition was tested, as in Example IX, the results for the same time periods were 0.0057, 0.0035 and 0.0023 for the material loss rates and 0.0111, 0.0176 and 0.0236 for the weight losses.

A comparison of the results clearly indicates that the addition of the boric acid gives an improved result over that obtained by the practice of the invention disclosed and claimed in the aforementioned application Ser. No. 196,498, that is, the use of asbestos alone.

A consideration of the foregoing clearly shows the advantages of the present trowelable elastomeric insulating composition which is useful in combination with other heretofore used ablative coatings particularly adapted for use in the combustion chambers of rockets.

Although the foregoing has illustrated and described the invention in detail, it is expressly understood that various changes may be made without departing from the scope of the invention as will be understood by those skilled in the art.

What is claimed is:

1. A trowelable, ablative, room curing insulating material comprising the following:
   (a) the produce of 100 parts by weight of an epoxy resin that has more than one 1,2 epoxy group per molecule and that is normally liquid at temperatures below 65° C. and between 75 and 250 parts by weight of a long chain aliphatic polysulfide flexibilizing agent and (b) between about 1 and 200 parts of substantially unreacted boric acid.

2. The insulating material according to claim 1 wherein the polysulfide is a mercaptan terminated along chain aliphatic polymer containing disulfide linkages in the chain backbone.

3. The material according to claim 2 further containing an inert filler.

4. The material according to claim 3 also including a curing agent.

5. A trowelable, ablative, room curing insulating material exhibiting a low material loss rate and weight-loss when subjected to an oxyacetylene test (O/A Test) comprising:

(a) the reaction product of 100 parts by weight of an epoxy resin having more than one 1,2 epoxy group per molecule and which exists as a liquid at a temperature of less than 65° C. and between about 75 and 250 parts of a polysulfide polymer having a molecular weight of about 1000, a viscosity of about 1000 cps. at 80° F. and a specific gravity of about 1.27, (b) at least one part of an impalpable boric acid having a specific gravity of 1.435 and a particle size such that 70 percent passes through a 325 mesh screen, (c) An inert filler in an amount of up to 40 parts per 100 parts of the epoxy resin, and (d) an amine curing catalyst in an amount to effect a cure of the insulating material.

6. The material according to claim 5 wherein said inert filler is asbestos.

7. The material according to claim 5 wherein said catalyst is used in an amount of up to about 10 parts per 100 parts of the epoxy resin.

References Cited

UNITED STATES PATENTS 3,006,936  10/1961  Findley _____ 260—18

FOREIGN PATENTS 931,000  7/1963  Great Britain.

OTHER REFERENCES

Epoxy Resins, Lee and Neville, McGraw-Hill Book Co., New York, 1957, pages 164–182.

MURRAY TILLMAN, Primary Examiner

P. LIEBERMAN, Assistant Examiner

U.S. Cl. X.R.

260—2, 79, 79.1, 97, 830

PO-1050
(5/69)

UNITED STATES PATENT OFFICE
CERTIFICATE OF CORRECTION

Patent No. 3,457,215      Dated July 22, 1969

Inventor(s) John G. Sommer, Jr.

It is certified that error appears in the above-identified patent and that said Letters Patent are hereby corrected as shown below:

Column 2, line 71, the word "insulations" should be ---insulating---. Column 4, line 60, the phrase "100 parts of a bis-phenol A polyglycidyl ether of" should be ---100 parts of a polyglycidyl ether of bis-phenol A---. Column 6, line 72, the word "produce" should be ---product---.

SIGNED AND
SEALED
NOV 18 1969

(SEAL)
Attest:

Edward M. Fletcher, Jr.
Attesting Officer

WILLIAM E. SCHUYLER, JR.
Commissioner of Patents